UNITED STATES PATENT OFFICE.

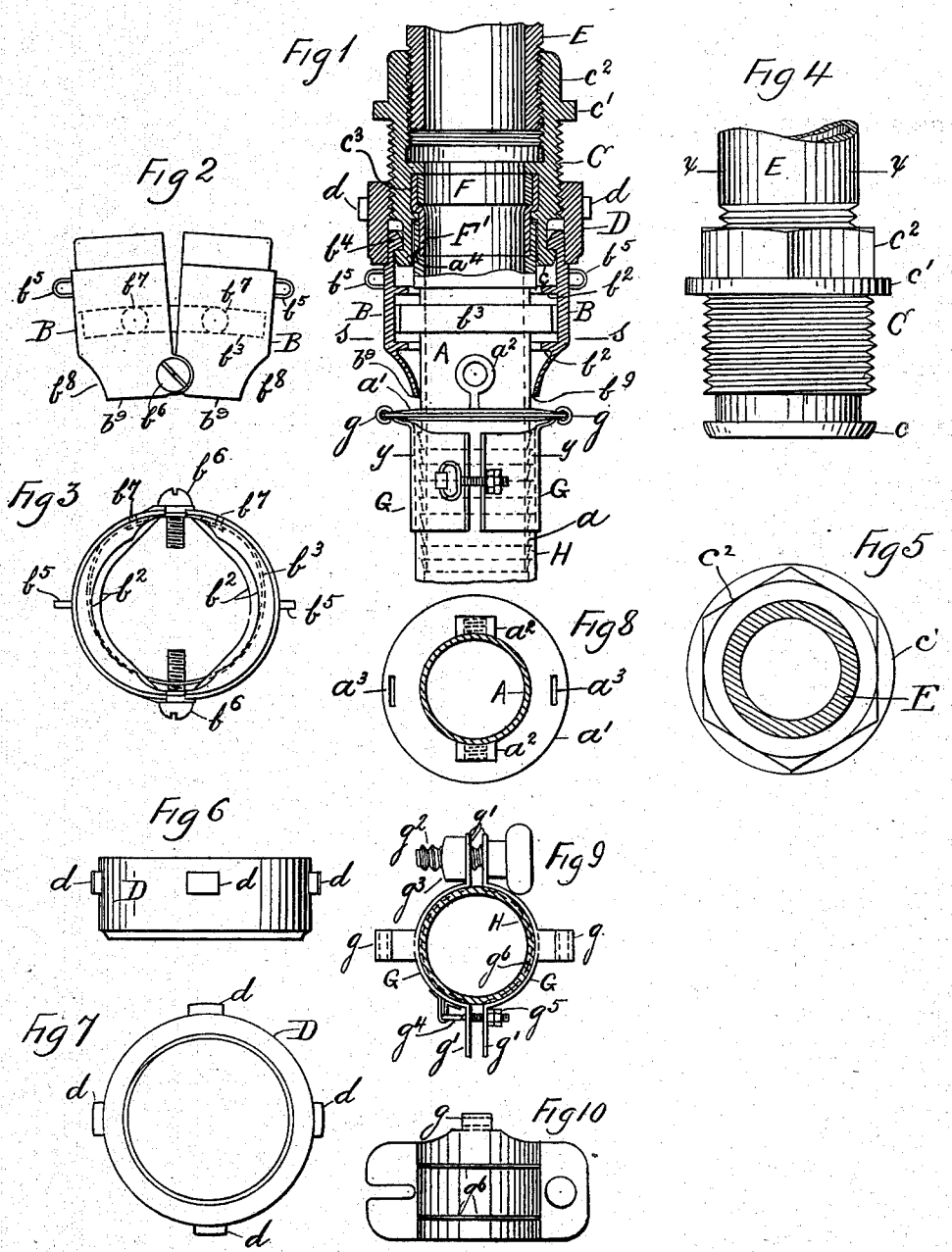

EDWARD VOGEL, OF NEW YORK, N. Y., ASSIGNOR OF ONE-HALF TO JACOB A. ONDRAK, OF NEW YORK, N. Y.

COUPLING.

SPECIFICATION forming part of Letters Patent No. 714,266, dated November 25, 1902.

Application filed August 22, 1901. Serial No. 72,883. (No model.)

*To all whom it may concern:*

Be it known that I, EDWARD VOGEL, a citizen of the United States, and a resident of the borough of Manhattan, in the county of New York and State of New York, have invented certain new and useful Improvements in Couplings, of which the following is a specification.

This invention relates to self-locking couplings, and has for its object the production of couplings which will be applicable for securing tight joints for both liquids and gases or vapors without employing keys, wrenches, or any other devices not inherent in the apparatus.

Referring to the drawings, Figure 1 represents a partial vertical section through the longitudinal axis of my coupling. Fig. 2 shows an elevation of the jaws. Fig. 3 is a top view of Fig. 2. Fig. 4 represents an elevation of male portion of the coupling with a pipe. Fig. 5 shows a section of Fig. 4 on the line $x$ $x$. Fig. 6 shows an elevation of the screw-collar. Fig. 7 is a plan view of Fig. 6. Fig. 8 is a partial section on the line $s$ $s$ of Fig. 1. Fig. 9 is a partial section of Fig. 1 on the line $y$ $y$. Fig. 10 shows an inside elevation of one member of the clamps.

The coupling comprises the tube or pipe A, to which are journaled the jaws B, constituting the female end of the coupling. The tube or pipe C is hooked to the said jaws over the tube A and constitutes the male portion of the apparatus. A screw-collar D turns on threads formed on the tube C and clamps the ends of the jaws B when in operative position. A pipe E is shown extending from the tube C, although hose or any other conduit might be substituted, and if a hose it could be secured with clamps, as will be explained for the hose connection of the tube or pipe A.

The tubes A and C are joined by a flexible packing F', the construction of which will be explained. Considering the details the tube A comprises the grooved end $a$, collar $a'$, bosses $a^2$, and counterbore $a^4$ at its upper end for the packing F'.

The jaws B are journaled on the screw-bearings $b^6$, which are secured in the bosses $a^2$. A spring $b^3$ is fastened to the jaws B between the protecting-flanges $b^2$ by means of screws or rivets $b^7$. The jaws terminate in hooks $b^4$ at their upper ends, and handles $b^5$ are formed on the outside faces of the said jaws.

The tube or pipe C is threaded on its central portion and terminates in hooks $c$, which engage with the hooks $b^4$ of the jaws B. A collar projects at $c'$, beyond which is formed a hexagon $c^2$, into which is screwed the pipe E.

It is evident that beyond the collar $c'$ a grooved end, as $a$, of the tube A might be substituted for the purpose of attaching a hose.

In the collar $a'$ of the tube A there are openings $a^3$ to hinge the hose-clamps G, the free ends of which swing on hinges $g$ in arcs that are in planes parallel to the longitudinal axis of the coupling and are clamped by means of the screw $g^2$ and nut $g^3$, bearing on the arms $g'$, and the swinging bolt $g^4$, with its jam-nuts $g^5$, closing the opposite arms of the clamps. Ribs $g^6$ extend from the inside of the faces of the clamps.

The screw-collar D turns on the threads of the tube C and clamps the ends of the jaws B.

The counterbore $a^4$ of the tube A contains the packing F', which is mechanically secured in an annular cavity $c^3$ in the tube C, although the cavity might be made in the tube or pipe A. A ring F is expanded on the internal surface of the packing F' and over the said counterbore $c^3$, securing by these means a uniform opening through the coupling.

To lock my coupling, the screw-collar D, having been screwed up on the central portion of the tube C, the hooks $b^4$ of the jaws B are forced over the hooks $c$ of the tube C, after which the collar D is screwed down to clamp the said jaws. The pressure of the fluid or gas will force the packing F' against the internal surface of the tube A and constitute a tightly-packed joint, its tightness increasing with the pressure of the fluid or gas.

When it is desired to unlock the coupling, the collar D is screwed up on the tube C and the jaws B pulled apart by means of the handles $b^5$, as shown in Fig. 2, when the two pipes or tubes A and C can be easily separated.

It will be noted that the lower ends $b^8$ of the jaws are curved to approach the tube or pipe A, and the bottom ends at $b^9$ would strike the said pipe A if it should be attempted to open the jaws too great a distance. The said ends $b^9$ also prevent foreign substances entering on the inside of the jaws.

Having described my invention, I desire to secure by United States Letters Patent and claim—

In a coupling, the combination of a pipe, jaws journaled to the pipe, means to force the jaws to the pipe, a second pipe axially in line with the first pipe, means to lock the two pipes, means to open the jaws, a collar on the second pipe arranged to clamp the jaws on the first pipe.

Signed at New York, in the county of New York and State of New York, this 21st day of August, A. D. 1901.

EDWARD VOGEL. [L. S.]

Witnesses:
AUGUST JOHNSTON,
WILLIAM P. FRANCL.